United States Patent [19]
Sakita

[11] Patent Number: 5,663,538
[45] Date of Patent: Sep. 2, 1997

[54] ELEVATOR CONTROL SYSTEM

[76] Inventor: Masami Sakita, 1259 El Camino Real # 121, Menlo Park, Calif. 94025

[21] Appl. No.: 414,226

[22] Filed: Mar. 31, 1995

Related U.S. Application Data

[63] Continuation-in-part of Ser. No. 154,034, Nov. 18, 1993, Pat. No. 5,419,414.

[51] Int. Cl.$^6$ ................................. B66B 1/18; B66B 9/00
[52] U.S. Cl. .................... 187/382; 187/386; 187/387; 187/383; 187/249
[58] Field of Search .................................. 187/380, 383, 187/386, 387, 382, 249

[56] References Cited

U.S. PATENT DOCUMENTS

| | | | |
|---|---|---|---|
| 1,896,777 | 2/1933 | James | 187/16 |
| 3,422,928 | 1/1969 | Burns | 187/386 |
| 3,658,155 | 4/1972 | Salter | 187/16 |
| 4,058,187 | 11/1977 | Jacoby et al. | 187/386 |
| 4,305,479 | 12/1981 | Bittar et al. | 187/29 R |
| 4,483,418 | 11/1984 | Umeda et al. | 187/29 R |
| 4,582,173 | 4/1986 | Schroder | 187/29 R |
| 4,846,311 | 7/1989 | Thangavelu | 187/125 |
| 4,926,976 | 5/1990 | Schroder | 187/125 |
| 5,107,962 | 4/1992 | Ekholm | 187/16 |
| 5,239,141 | 8/1993 | Tobita et al. | 187/127 |
| 5,274,202 | 12/1993 | Kezer et al. | 187/125 |
| 5,419,414 | 5/1995 | Sakita | 187/391 |

*Primary Examiner*—Robert Nappi
*Attorney, Agent, or Firm*—Victor R. Beckman

[57] ABSTRACT

An elevator system for a multistory structure having a plurality of elevator shafts is shown which includes at least one independently movable elevator car in each elevator shaft. A digital computer with memory is used to control elevator cars including the dispatch of cars from terminal floors. A daily control parameter table in memory identifies a plurality of different methods of scheduling dispatch of elevator cars from terminal floors, groups of floors to be serviced by each elevator car, and cars in a shaft to be coupled for tandem operation. The memory is periodically read for selecting for each elevator car one of said methods of scheduling dispatch and for identifying the group of floors to be serviced by the cars. The selected method of scheduling the dispatch of cars is implemented and cars are limited to servicing the selected group of floors. One method of scheduling dispatch includes obtaining a measure of estimated passenger demand for travel in one direction that is incapable of being met by cars currently in service. A passenger loading threshold limit for travel in the one direction is selected which may range from zero to maximum capacity of the elevator car to be dispatched. When the measure of estimated passenger demand for travel in the one direction that is incapable of being met by cars currently in service equals the passenger loading threshold limit a car dispatch signal is issued for dispatch of a car from the terminal floor. Where a plurality of independently-operated cars are included in a hoistway, operation in either a coupled or decoupled manner is provided.

11 Claims, 10 Drawing Sheets

| | |
|---|---|
| C27 | Upper Terminal for Car C27 |
| | Serviced Floors by CarC27 |
| C26 | Upper Terminal for Car C26 |
| | Serviced Floors by Car C26 |
| C25 | Upper Terminal for Car 25 |
| | Serviced Floors by Car C25 |
| C27 | Seviced by Car C27 |
| C26 | Seviced by Car C26 |
| C25 | Seviced by Car C25 |

Main floors

Serviced Floors by All Cars

Lower Terminal Floor

Lower Storage

ELEVATOR CONTROL SYSTEM

CROSS REFERENCE TO RELATED APPLICATION

This is a continuation-in-part application of application Ser. No. 08/154,034, filed Nov. 18, 1993 entitled Elevator System With Multiple Cars In the Same Hoistway by Masami Sakita, now U.S. Pat. No. 5,419,414.

BACKGROUND OF THE INVENTION

1. Field of the Invention

This invention relates generally to an elevator control system for controlling a plurality of elevator cars for use in elevator systems having one or more independently movable elevator cars in a plurality of vertical elevator shafts.

2. Description of Related Art

The use of group management systems for elevators that include digital computers for controlling operation of elevator cars is well known as shown, for example, in U.S. Pat. No. 5,083,640. There, car-position predicting means and predicted-empty-car detecting means are employed in assigning a predicted empty car to a floor call for reducing waiting time. Also, elevator systems that include a plurality of independently movable elevator cars in each elevator shaft are known as shown, for example, in U.S. Pat. No. 1,896,777. By operating more than one elevator car in a hatchway, it is possible to reduce the amount of floor space required for the elevator cars. Many prior art group management systems are not well adapted for use with both conventional elevator systems that include one elevator car in each hatchway and those systems that include a plurality of elevator cars in each hatchway.

SUMMARY OF THE INVENTION

The elevator system of the present invention is adapted for use in a multistory structure having a plurality of vertical elevator shafts each of which defines a vertical pathway extending past a plurality of floors of the structure. At least one elevator car is located in each of the elevator shafts for servicing a plurality of floors of the structure including lower and upper terminal floors and a plurality of intermediate floors. The system includes: floor call means at floors of the structure for registering up and down service requests for an elevator car; car call means at each elevator car for registering destination requests to floors of the structure; car position sensing means for sensing the position of elevator cars in the elevator shafts; load measuring means for providing a measure of the number of passengers in each elevator car; and, directional passenger demand measuring means for providing an estimate of passenger demand for travel in the up direction of travel and in the down direction of travel at each floor of the structure. Such directional passenger demand measuring means may include, for example, a video image capture/analyzer system in which the hardware comprises a video camera and suitably programmed computer equipped with a video image capture board at each floor. The system includes memory means with a control parameter table containing data identifying floors to be serviced by each of the elevator cars and the identity of a plurality of different methods that may be employed for dispatching elevator cars from the terminal floors. Signal processing means including digital computer means are associated with the memory means, floor call means, car call means, car position sensing means, load measuring means and directional passenger demand measuring means for use in controlling the elevator cars.

The control parameter table included in the memory means is periodically read every T seconds (where T equals, say, 1–2) for selecting for each elevator car one of the methods of dispatching elevator cars, for identifying the floors to be serviced by the car, for identifying storage locations for cars where more than one elevator car operates in a shaft, and for identifying coupling and decoupling locations of cars when tandem operation of cars is employed. The elevator cars are adapted to service those floors identified by said periodic reading from the memory means. Also, the selected method, or methods, of dispatch are implemented by the signal processing means which issues car dispatch signals for dispatching elevator cars from the terminal floors of the structure in accordance with the selected method, or methods. With the present invention, the method to be used for dispatching elevator cars, and the floor assignments for cars in each of the shafts, are established, or selected, on an on-line real-time basis and, therefore, may be changed at any time as required or desired. As noted above, historical and/or projected passenger demand data may be employed in the car dispatching method and floor assignment selection process.

Car dispatching methods include scheduled, demand-responsive, demand-responsive/scheduled, and request responsive. In the scheduled method, elevator cars in the same shaft group are periodically dispatched, with the time intervals between dispatches being dependent upon the time of day, historical directional demand data, or the like. In the demand-responsive method, a car dispatch signal is issued when a measure of the estimated passenger demand for travel in one direction that is incapable of being met by elevator cars currently in service at least equals a passenger loading threshold limit for travel in that direction. The passenger loading threshold limit may vary from zero to maximum capacity of the elevator car to be dispatched and may be dependent upon the time of day, historical directional demand data, or the like. The demand-responsive/scheduled method of dispatch comprises a combination of the demand-responsive and scheduled methods wherein a car dispatch signal is issued if the elapsed time since the last dispatch from the terminal floor at least equals the preset time interval, or if the measure of estimated passenger demand incapable of being met by cars currently in service at least equals the passenger loading threshold limit. In the request responsive method an elevator car is dispatched in response to a floor call.

As noted above, the present system may include a plurality of independently movable elevator cars in each elevator shaft, in which case storage areas may be provided above the upper terminal floor and below the lower terminal floor for storage of cars not currently in service. When more than one elevator car is included in an elevator shaft they may be operated in different operating modes under control of the signal processing means. For example, control signals produced by the signal processing means may provide for simultaneous servicing of a plurality of the serviced floors by the plurality of elevator cars. For maximum safety, elevator cars in a shaft may be limited to travel in the same direction until all cars have reached one of the terminal floors at which time the direction of all cars is reversed. In another mode of operation, the rear-most trailing car may be allowed to reverse direction of travel before reaching a terminal floor. In another operating mode, a plurality of elevator cars in the same shaft may be coupled so as to travel simultaneously in tandem in a manner similar to that of conventional multi-deck elevator cars. Such operation is particularly useful for travel in the direction of low traffic demand when traffic demand in the opposite direction is very heavy since headway in the low traffic demand direction of travel is minimized and the cars are returned to the terminal floor at which they are most needed with a minimum of lost time.

The invention together with other features and advantages thereof will be more fully understood from a consideration of the following detailed description thereof taken in connection with the accompanying drawings. It here will be understood that the drawings are for purposes of illustration only, the invention not being limited to the specific embodiments disclosed herein.

BRIEF DESCRIPTION OF THE DRAWINGS

In the drawings, wherein like reference characters refer to the same parts in the several views.

DETAILED DESCRIPTION OF THE INVENTION

1. Introduction

Figure 1:
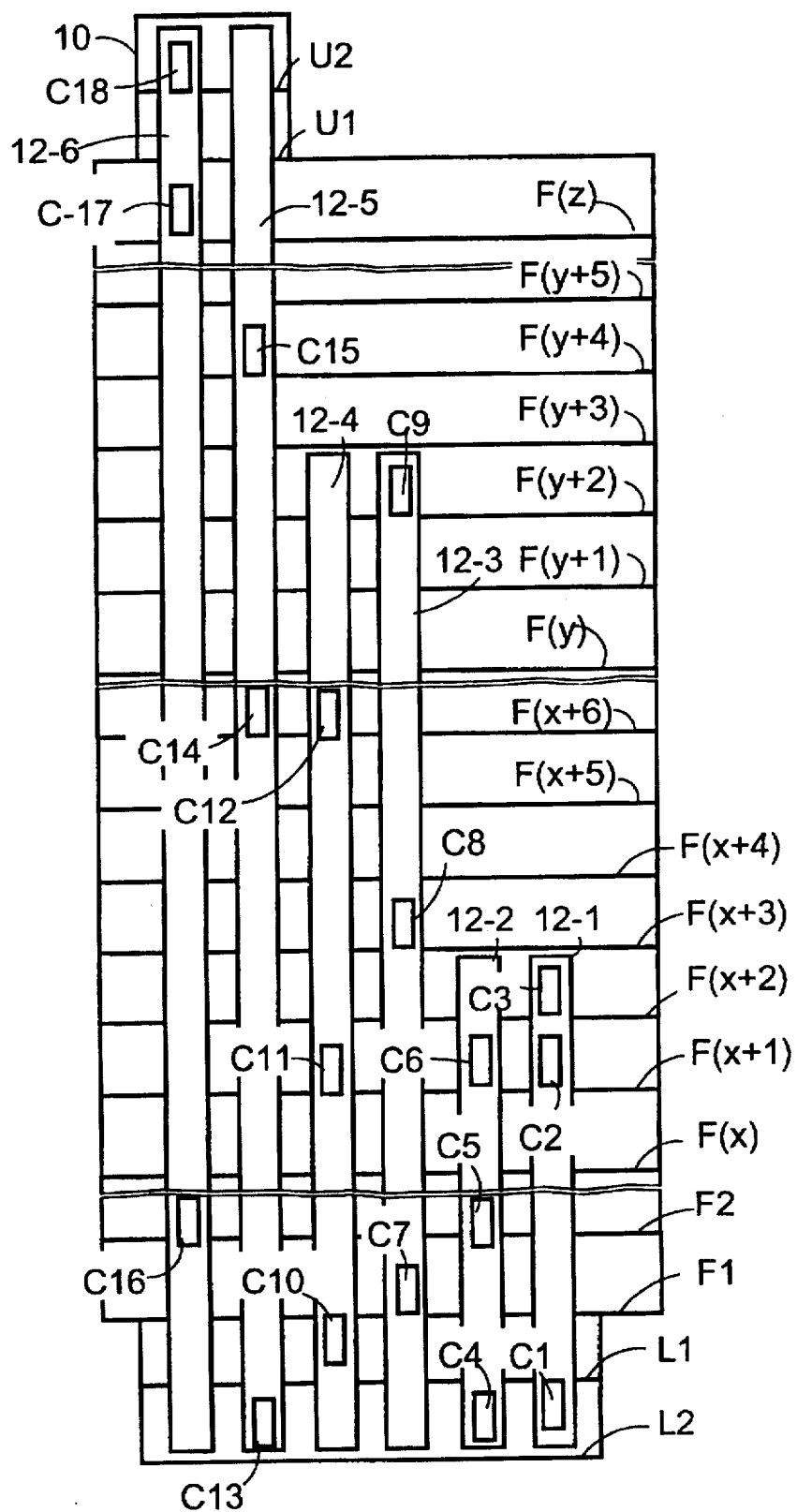
FIG. 1 is a diagrammatic elevational view of a multistory structure having an elevator system adapted for use with the control system of the present invention.

Reference first is made to FIG. 1 of the drawings wherein a multistory building structure 10 is shown which includes vertical elevator shafts 12-1 through 12-6. One or more independently operated elevator cars are located in each shaft and, for purposes of illustration only, three elevator cars C1 through C3, C4 through C6, C7 through C9, C10 through C12, C13 through C15, and C16 through C18 are shown in each of the shafts 12-1 through 12-6, respectively. The illustrated building includes floors, or landings F1 through F(z) that are serviced by the elevator cars. Again, for purposes of illustrating, floors F1 through F(x) are serviced by cars C1 through C6, floors F1 and F(x+1) through F(y) are serviced by cars C7 through C12 and, floors F1 and F(y+1) through F(z) are serviced by cars C13 through C18. Floor F1, such as the building lobby, comprises both the main floor of the building and the lower terminal floor for all of the elevators cars in the illustrated system. It will be noted that each elevator shaft 12-1 through 12-6 extends beneath the lower terminal floor F1 to provide a lower storage area for those cars that operate beneath the uppermost cars. The illustrated structure includes floors L1 and L2 adjacent the lower storage area for ready access to cars stored at the lower storage area.

Elevator shafts 12-1 and 12-2 extend upwardly at least two floors above upper terminal floor F(x) to provide an upper storage area for cars C2 and C3, and C5 and C6, that operate directly above lowermost cars C1 and C4, respectively. Similarly, elevator shafts 12-3 and 12-4 extend upwardly at least two floors above upper terminal floor F(y) to provide an upper storage area for cars C8 and C9, and C11 and C12, that operate directly above lowermost cars C7 and C10, respectively. Elevator shafts 12-5 and 12-6 extend upward by at least two floors above upper terminal floor F(z) to provide an upper storage area for cars C14 and C15, and C17 and C18, respectively. The building structure includes floors U1 and U2 adjacent the upper storage area for access to cars stored thereat.

2. Control System Hardware

Figure 2:
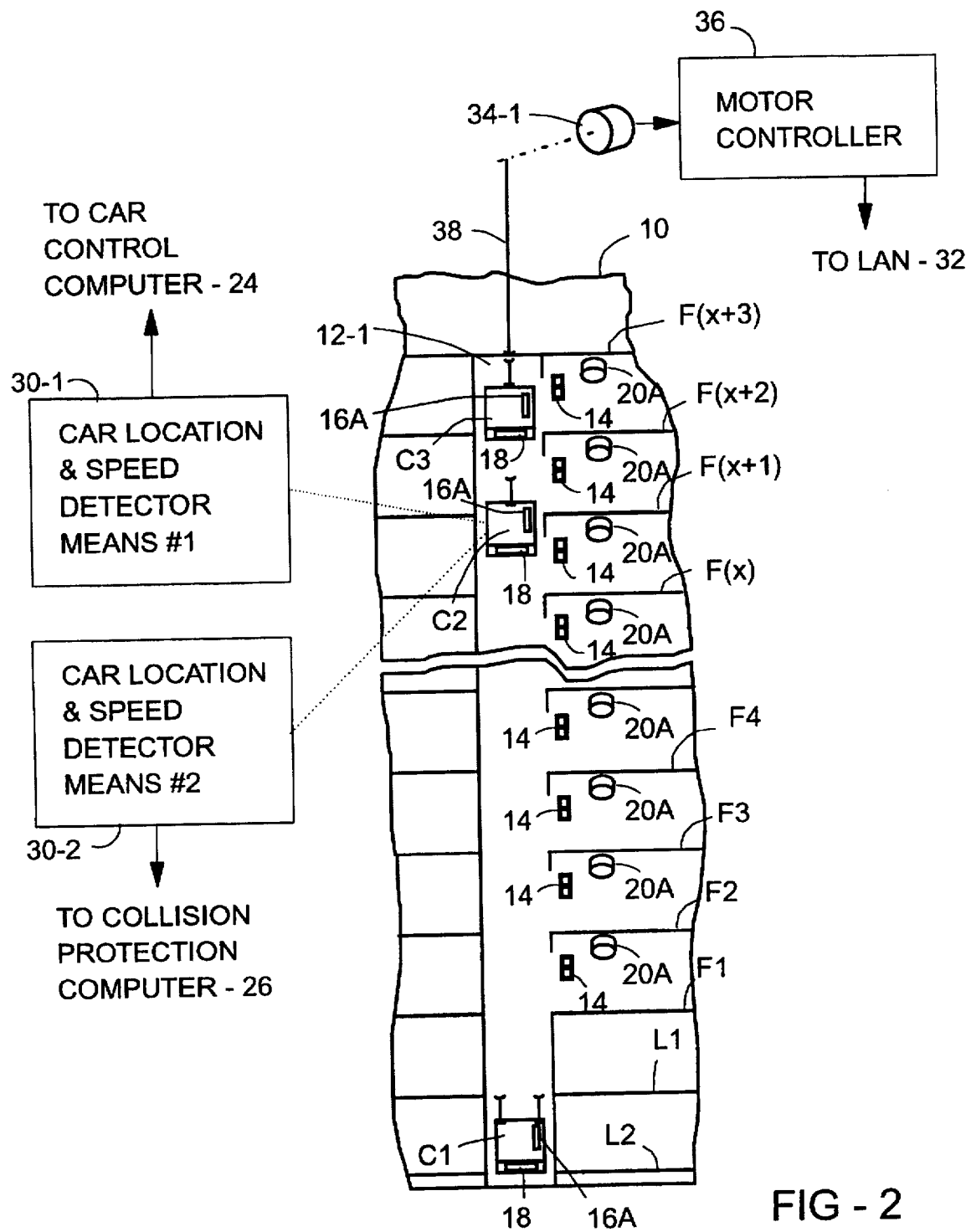
FIG. 2 is a fragmentary diagrammatic view of one of the elevator shafts and associated elevator cars shown in FIG. 1 and including elements of the elevator control system.
Figure 3:
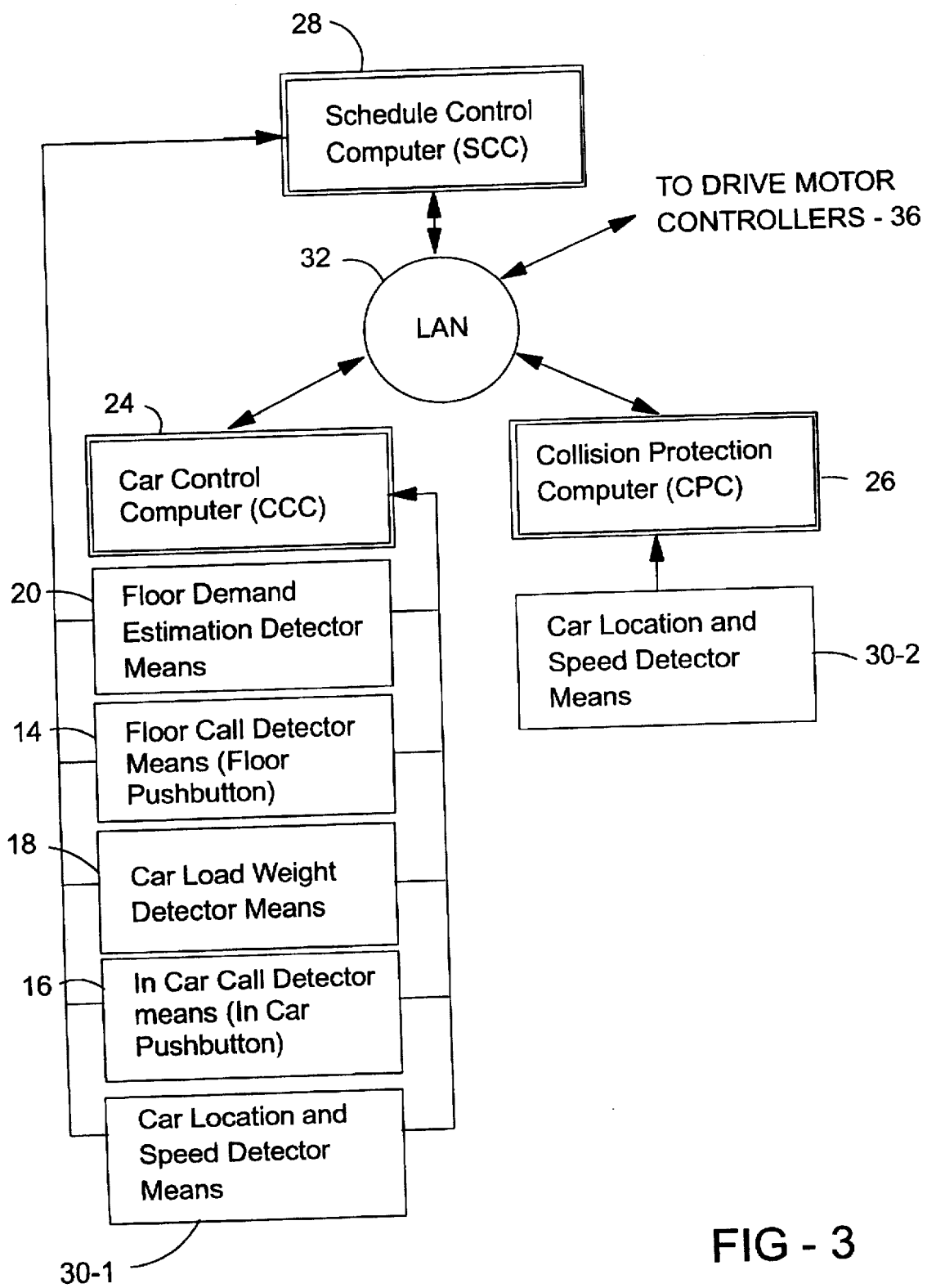
FIG. 3 is a simplified block diagram of a computerized elevator control system of a type adapted for use with the present invention.

Reference now is made to FIGS. 2 and 3 of the drawings wherein hardware included in the control system of this invention is shown. In FIG. 2, for simplicity, only cars C1 through C3 in the one elevator shaft 12-1 are shown together with associated detector and control means. It will be understood that cars in the other shafts are provided with similar detectors and control means. Floor call detector means 14, comprising e.g. floor pushbuttons, are located at floors of the building for use in registering up and down service requests for an elevator car. Also, each car includes car call detector means 16 (FIG. 3) comprising a car operating panel 16A (FIG. 2) having in-car call pushbuttons by means of which passengers enter destination requests to one of the floors serviced by the elevator car. Load weight detector means 18 are carried by each car to provide load weight information signals dependent upon the load on the car floors. The load weight information signals are used to obtain a measure, or estimate, of the number of passengers in each of the elevator cars which, in turn, provides an estimate of in-car demand for elevator service.

Floor demand estimation detector means 20 (FIG. 3) are provided for each of the serviced floors for estimating the number of passengers waiting for an elevator at each serviced floor of the building. The floor demand estimation detector means includes video camera means 20A (FIG. 2) at each of the serviced floors for viewing the area adjacent the floor call means 14. Output from the video camera means is supplied to a computer equipped with a video image capture board. The computer software captures the digital image of the floor taken by the camera and analyzes the captured graphical image, to provide an estimate of the number of passengers waiting on that floor. The estimated number is updated every scanning interval of the video camera, for example, every one second. A simple algorithm for such an estimation includes taking of samples of digitized color pixels in a grid pattern on the graphics image, counting the number of pixels that do not have the same color as the color of the floor, and empirically estimating the number of people waiting. Obviously, other prior art means for estimating the number of waiting passengers may be employed.

The system includes three groups of digital computers, including car control computers 24 (CCC), collision protection computers 26 (CPC) and schedule control computers 28 (SCC), one of each of which computers is shown in FIG. 3. There is one car control computer 24 and one collision protection computer 26 for each elevator car in the system, which computers may be located on-board the elevator cars. There may be a fewer number of schedule control computers 28 in the system. For example, there may be one schedule control computer 28 for each group of elevators in a shaft. The computers may comprise suitably programmed microcomputers.

First and second independently operated car location and speed detector means 30-1 and 30-2 are provided for sensing the position and speed of each of the elevator cars. Outputs from the first location and speed detector means 30-1 are supplied to a car control computer 24 (CCC) and schedule control computer (SCC) 28, and outputs from the second location and speed detector means 30-2 are supplied to a collision protection computer (CPC) 26. The use of different location and speed detector means 30-1 and 30-2 and associated computers 24, 28 and 26 ensures safety of operation of the system. The schedule control computer (SCC) 28 functions to schedule dispatch of elevator cars from the terminal floors and from storage. The control system includes a communications network 32 (FIG. 3), such as a local area network (LAN), to which computers 24, 26 and 28 are connected. Each elevator car is provided with an associated drive motor and motor controller 36 which motor controllers also are connected to the communications network 32. One drive motor 34-1 is shown in FIG. 2 connected by drive rope 38 to elevator car C3 for moving the car up and down within the elevator shaft 12-1.

In the hardware configuration shown in FIG. 3, detector means related to estimating passenger demand, i.e. detector means 14, 16, 18 and 20, are directly connected to car control and schedule control computers 24 and 28, respectively; the first car location and speed detector means 30-1 are directly connected to car control and schedule control computers 24 and 28; and the second car location and speed detector means 30-2 are directly connected to collision protection computer 26. Alternatively, detector means 14, 16, 18 and 20 may be directly connected to only the schedule control computer 28, while the first and second car location and speed detector means 30-1 and 30-2 are directly connected to the car control and collision protection computers 24 and 26, respectively. Yet another alternative is to directly connect car-related detector means 16 and 18 and location and speed detector means 30-1 to the on-board car control computer 24; directly connect floor-located detector means 14 and 20 to associated schedule control computer 28; and directly connect car location and speed detector means 30-2 to associated collision protection computer 26. The exact method of wiring between computers and detector means is not critical and may be affected by the location of the computers and functions to be performed. Computer systems of the distributed type which include a plurality of digital computers interconnected by communications networks are well known and require no detailed description.

Figure 4:
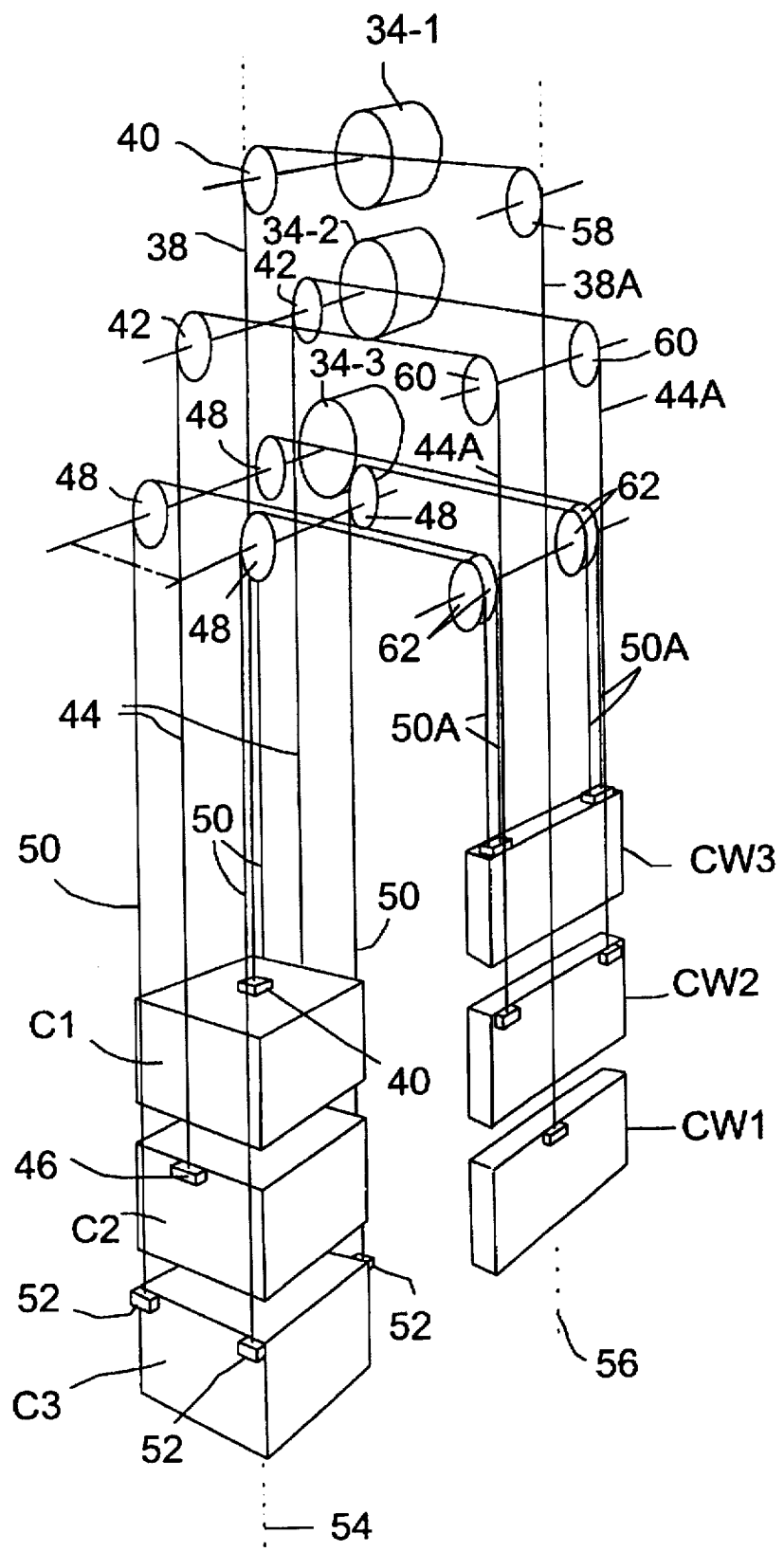
FIG. 4 is a simplified diagrammatic perspective view of a plurality of elevator cars and associated drive means for moving the cars.

Drive means for movement of a plurality of elevator cars that are independently movable along a vertical elevator shaft are well known in the prior art including the above-mentioned copending application Ser. No. 08/154,034. Reference is made to FIG. 4 wherein elevator hoisting means of the same type as shown in copending patent application Ser. No. 08/154,034 are shown. In FIG. 4, the elevator cars C1, C2 and C3 are shown with associated drive motor means 34-1, 34-2, and 34-3 for moving the cars up and down within elevator shaft 12-1 along a vertical axis. Motor 34-1 is connected to a drive sheave, or wheel, 40 around which car drive ropes, or hoisting cables, are wound, one of which ropes 38 is shown in the drawings. The drive ropes 38 are attached as by attachment lugs 40 to elevator car C1. Motor 34-2 is connected to drive sheaves, or wheels, 42 around which car drive ropes 44 are wound, which drive ropes are attached to elevator car C2. Drive ropes 44 extend past elevator car C1 and are affixed to car C2 as by means of attachment lugs 46 attached to car C2, one of which lugs is shown in FIG. 4. Motor 34-3 is connected to drive sheaves, or wheels 48 around which drive ropes 50 are wound, which drive ropes are affixed to car C3. Drive ropes 50 extend past both elevator cars C1 and C2 and are affixed to car C3 as by means of attachment lugs 52, three of which are seen in FIG. 4. Guide means not shown guide the elevator cars C1 through C3 for movement along a vertical axis 54 upon operation of the associated motors.

Each elevator car C1 through C3 is provided with an associated counterweight CW1 through CW3, which counterweights are suspended within the elevator shaft at a laterally spaced distance from the cars. Guide means, not shown, guide the counterweights for movement along a vertical axis 56 a parallel spaced distance from vertical axis 54. The counterweights are arranged in order opposite that of the elevator cars so that counterweight CW1 is lowermost and counterweight CW3 is uppermost. The counterweights are shown connected to the elevator cars C1, C2 and C3 through the respective drive ropes 38, 44 and 50. Counterweight CW1 is supported by ropes, or cables, 38A (one of which is shown in FIG. 4) affixed to the counterweight, which ropes pass over idler wheel 58 and are wound on drive sheave 40. Counterweight CW2 is supported by ropes, or cables, 44A affixed to the counterweight, which ropes pass over idler wheels 60 and are wound on drive sheaves 42. Finally, counterweight CW3 is supported by ropes, or cables, 50A affixed to the counterweight, which ropes pass over idler wheels 62 and are wound on drive sheaves 48. Obviously, ropes 38A, 44A and 50A for support of counterweights CW1, CW2 and CW3 could be connected to the elevator cars C1, C2 and C3 through means other than the hoisting ropes and drive sheaves as shown.

3. Definition of Terminology

Several terms used in the present application are defined as follows.

REQUEST

As noted above, floor call detector means 14 are located at floors of the building for detecting up and down service requests for an elevator car. A request is a signal transmitted by activation of a floor call detector, such as a pushbutton, at one of the floors and received by the car control computer 24 (and schedule control computer 28) indicating that a person needs elevator service.

FLOOR DEMAND

Floor demand is the number of persons needing elevator service at the building floors. Estimates of floor demand both for upward and for downward direction of movement are obtained using outputs from detector means 14 and 20. As will become apparent hereinbelow, such estimates of floor demand are employed in determining demand for dispatch of elevator cars from terminal floors.

DEMAND FOR DISPATCH FROM TERMINAL FLOOR (DISPATCH DEMAND)

Demand for dispatch from terminal floor, or dispatch demand, is floor demand for service which can not be met by cars presently in service. Estimates of dispatch demand both for upward and downward direction of movement are obtained.

DISPATCH FROM A TERMINAL FLOOR

For cars positioned at a terminal floor (either an upper or lower terminal floor of the shaft) dispatch from a terminal floor includes: (1) giving permission to open the elevator car door at the terminal floor; and (2) starting the car from the terminal floor for passenger service. The time when the permission is given to open the car door at the terminal floor preferably is used as the reference point in time of a dispatch. If the elevator car is located at a storage area, the two steps above are preceded by dispatching an elevator car from the adjacent storage space to position it at the adjacent terminal floor.

DISPATCH INTERVAL

The dispatch interval is the time between two consecutive dispatches from the same terminal floor in the group of elevator shafts that serve the same floors.

HEADWAY

Headway is the time between two consecutive cars in the same elevator shaft.

4. Building Demand Pattern

As is well understood, each building has its own demand pattern, dependent upon characteristics of businesses in the building. For example, if the building is used as office space, the demand pattern may be:

1) extremely light bi-directional late at night,
2) light upward in the early morning,
3) heavy upward during the morning peak period,
4) light to medium bi-directional later in the morning,
5) heavy downward before the lunch period,
6) heavy upward after the lunch period,
7) light to medium bi-directional in the afternoon,
8) heavy downward during the evening peak period, and
9) light downward in the late evening.

Or, if the building is a high-rise apartment, the demand pattern may be:

1) extremely light bi-directional late at night,
2) light downward in the early morning,
3) heavy downward during the morning peak,
4) light to medium bi-directional during the middle of the day,
5) heavy upward during the evening peak period, and
6) light upward in the late evening.

Regardless of the building demand pattern, it is a goal of the present invention to serve the demand within a reasonably short time, and without an excess waste of energy. With the computer control system of the present invention, different demand characteristics are readily accommodated. The present system not only implements demand estimation and scheduling control, but also controls elevator cars in conjunction with the schedule control.

5. Schedule Control Computer Functions

In the multiple car system shown in FIG. 1, each elevator shaft is assigned to predefined floors of the building. Also, for safety and simplicity, normally all elevator cars in the same shaft are sent in the same direction from one terminal floor to the other, without reversing direction at a floor intermediate the terminal floors. The schedule control computers 28, which control scheduling of the elevator cars perform the following functions:

1) process on-line and historical or projected passenger demand data,
2) process on-line car data,
3) determine when a car should be dispatched from which shaft,
4) determine, while the car is travelling, whether the car should stop at the next floor,
5) determine whether or not the car's trip should be terminated when no passengers are detected inside the car, and
6) determine whether or not the car should be sent to storage at the destination terminal.

6. Schedule Control Methods

The novel control system of this invention is adapted to implement a variety of car dispatching methods including:

1) scheduled method,
2) demand-responsive method,
3) demand-responsive/scheduled method, and
4) request responsive.

Using the scheduled method, dispatch intervals are specified in accordance with the time of day, historical directional dispatch demand data, or the like.

In the demand-responsive method, a car is dispatched whenever the demand for dispatch of a car from a terminal floor exceeds a preset passenger loading threshold limit. Dispatch demand comprises, essentially, the floor demand for service which can not be met by cars presently in operational service. It is estimated from estimates of floor demand (using outputs from floor call detector means 14 and floor demand estimation detector means 20) and in-car demand (using outputs from car load weight detector means 18). Different threshold limits may be used dependent, for example, upon passenger demand, time of the day, direction of travel, or the like. For example, in the major direction of demand during peak periods, the threshold limit may be as high as the capacity of the elevator car and, in the other direction of travel may be as low as zero. At other times, for example, the threshold limit may be half the car capacity in both directions.

The demand-responsive/scheduled method comprises a combination of the demand-responsive and scheduled methods. Using this method, a car is dispatched from a terminal floor either if the elapsed time since the last dispatch from the floor is greater than a preset interval, or if the estimated dispatch demand for the next car exceeds a certain passenger loading threshold limit.

In the request-responsive dispatch method an elevator car is dispatched in response to a floor call when a passenger presses a floor pushbutton 14. This method primarily is used when traffic is very light.

In the tandem method, a plurality of cars in the same shaft are operated simultaneously at the same rate adjacent each other; the operation being similar to that of multideck elevator cars. As described hereinbelow, this method is used primarily for return of cars from one terminal floor to the other in the direction of substantially no passenger demand when passenger demand in the opposite direction is very high. With this operating method, minimum time is required for such return of the cars. The coupling of cars for such tandem operation, and uncoupling thereof for independent operation, are under computer control and may take place at any location within an elevator shaft.

7. Demand-Responsive/Scheduled Car Dispatching Method

Figure 5:
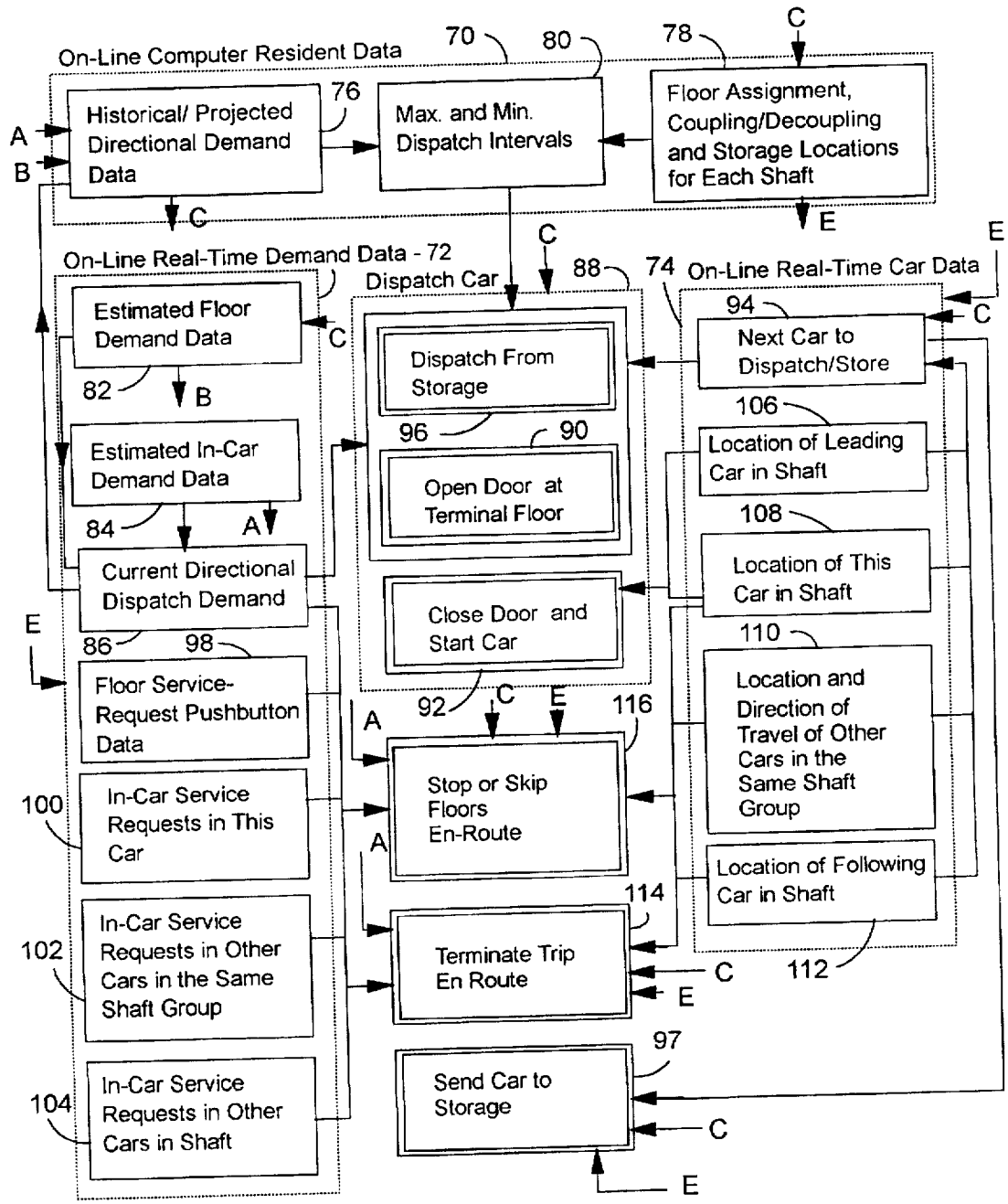
FIG. 5 is a simplified flow diagram for use in explaining operation of the control system of this invention.

The demand-responsive/scheduled car dispatching method (method 3) above) comprising a combination of methods 1) and 2) is particularly useful for operating multiple-car elevator systems such as illustrated in FIG. 1. FIG. 5 shows data used in car control decisions when the demand-responsive/scheduled car-dispatching method is employed. Decisions that are dependent upon the data are shown in blocks with double-line boarders in FIG. 5. Data is shown in three blocks labelled "on-line computer-resident data 70", "on-line real-time demand data 72" and "on-line real-time car data 74". On-line computer resident data (block 70) includes historical or projected directional dispatch demand data (block 76) comprising a running average of directional demand for dispatch of a car, estimated floor demand, and estimated in-car demand based upon month of year, day of week, time of day, or the like. On-line computer-resident data (block 70) also includes the floor assignment, coupling/decoupling, and storage location for cars in each elevator shaft (block 78). Here groups of floors to be serviced by cars are identified. As noted above, for the building shown in FIG. 1, cars in a first shaft group comprising shafts 12-1 and 12-2 are assigned to service the group of floors F1 through F(x), cars in the shaft group comprising shafts 12-3 and 12-4 are assigned to the group of floors F1 and F(x+1) through F(y), and cars in the shaft group comprising shafts 12-5 and 12-6 are assigned to the group of floors F1 and F(y+1) through F(z). With the control system of the present invention, change in floor assignments for the elevator shafts is readily provided under computer control for meeting changing demands for service. Car coupling and decoupling data for tandem and independent car operation are included in block 78. The storage location for each shaft also is specified at block 78. When demand is light such that operation of all cars is not required, some cars may be stored at an upper or lower storage area. The area selected for storage is dependent upon the anticipated direction of increased traffic. If, for example, it is anticipated that traffic will be increasing in the upward direction, storage of cars at the lower storage area would be specified. Historical and/or projected directional demand data (block 76) may be utilized in establishing floor assignment, coupling/decoupling and storage locations for every shaft (block 78). It here will be noted that historical and/or projected directional demand data (block 76), in addition to being supplied to block 78, is supplied to other blocks including blocks 82, 88, 94, 97, 114 and 116 described hereinbelow, as shown by line C. Also, data from block 78, in addition to being supplied to block 80, is supplied to other blocks including blocks 72, 74, 97, 114 and 116 as shown by line E.

Maximum and minimum dispatch interval data (block 80), which is shown to be dependent both upon historical or projected directional demand (block 76) and floor assignment for each shaft (block 78), comprises the maximum and minimum time-intervals between consecutive dispatches of cars from the same terminal floor in the same shaft group.

On-line real-time demand data (block 72) includes estimated floor demand data (block 82) and estimated in-car demand data (block 84). Estimated floor demand data (block 82) is obtained using outputs from floor call detector means 14 and floor demand estimation detector means 20 shown in FIG. 3. The number of persons waiting for an elevator car in the same shaft group is estimated using floor demand estimation detector means 20. Obviously, if only an up pushbutton is actuated, all persons estimated to be waiting are determined to request an up elevator, and if only a down pushbutton is actuated, all persons estimated to be waiting are determined to request a down elevator. When both up and down pushbuttons are actuated at a given floor an estimate is made as to the number of persons requesting an up car and the number requesting a down car. Such an estimate may be made using historical directional demand data (block 76) or the like. Estimated floor demand data provides a measure of estimated directional passenger demand for travel in each of the up and the down directions of travel.

Estimated in-car demand data (block 84) is obtained using outputs from car load weight detector means 18 shown in FIG. 3. Elevator car floor weight provides an estimation of the number of passengers in an elevator car. Since the weight of clothing worn by passengers may differ between seasons, such as winter and summer, such estimation may differ accordingly. Obviously, other means may be employed to obtain an estimate of the number of passengers in an elevator car including, for example, video camera means of the type used in the estimation of floor demand.

For a shaft group, estimated floor demand data (block 82) together with estimated in-car demand data (block 84) are used to provide a measure of current directional dispatch demand (block 86). As noted above, cars in the shaft group that are already in service and are not full may be used to satisfy at least some of the current floor demand. Current directional dispatch demand (block 86) is a measure of estimated directional passenger demand for travel in one direction that is incapable of being met by elevator cars presently in service. If operation of cars is limited to travel from one terminal floor to the other without reversing direction at an intermediate floor, cars in service in the opposite direction of travel will not be available for servicing demand for travel in the one direction until the destination terminal floor is reached. As noted above, a measure of estimated directional passenger demand for travel in each direction is obtained from estimated floor demand data (block 82).

When the current directional dispatch demand (block 86) at least equals a passenger loading threshold limit, a signal is given to dispatch a car (block 88) When using either the demand-responsive method or the demand-responsive/scheduled method. As noted above, the threshold limit may be as low as zero or as high as the capacity of the elevator car.

With the demand-responsive/scheduled car dispatching method, a signal is given to dispatch a car (block 88) if either the current directional dispatch demand (block 86) equals, or exceeds, a threshold limit, or the elapsed time since the last dispatch from the terminal floor equals a maximum dispatch interval (block 80). Dispatching a car from a terminal floor involves opening a car door at the terminal floor (block 90) followed by closing the car door and starting the car (block 92). If there is no floor call at the terminal floor, the car may be dispatched from the terminal floor without first opening and closing the car door. The car to be dispatched from the terminal floor is determined by next car to dispatch/store data (block 94). Next car to dispatch/store data (block 94) is dependent upon the position of cars in the shaft and other cars in the same shaft group in addition to historical or projected directional demand data (block 76) and block 78 data. When a plurality of cars in a shaft provide service, overall efficiency of service may depend upon the sequence in which cars are dispatched as discussed in greater detail hereinbelow. Data from next car to dispatch/store (block 94) is also used in the decision to dispatch a car from storage (block 96). During periods of time when more than one car in a shaft provide service, a car is dispatched from storage (block 96) to the adjacent terminal floor where it remains with its door closed until a signal to dispatch a car from the terminal floor is received. The next car to dispatch/store data (block 94) also is used in the decision to send a car to storage (block 97). The number of cars to be left in storage at any given time of day may be controlled by adjusting the dispatch interval and the threshold limit for passenger loading when using the demand-responsive/scheduled car dispatching method. These values may be changed on an on-line basis. Also, during such times, a preferred mode of operation for maximum safety is to have the cars travel from one end of the shaft to the other without reversing direction at a floor intermediate the terminal floors.

In summary, the following tasks are performed during the demand-responsive/scheduled car dispatching method:

1) obtain an estimate of current directional dispatch demand (block 86) from,
   a) estimate of passenger floor demand for a given direction of travel at each floor,
   b) estimate of passenger floor demand for a given direction of travel at all floors, and
   c) estimate of what part of the passenger floor demand will be served by elevator cars that have already left the terminal floor,
2) Compute the amount of time since the previous dispatch and determine if it equals or exceeds the scheduled maximum dispatch interval (block 80),
3) When scheduled for operation with more than one elevator car in an elevator shaft, dispatch a car from storage so that the car will be at the terminal floor with the door closed when a signal to dispatch is received (block 96),
4) Dispatch a car from the terminal floor (block 88) if either the estimate of current directional dispatch demand exceeds a threshold limit, or the elapsed time since the last dispatch exceeds the scheduled maximum dispatch interval. Dispatching of a car from the terminal floor may or may not include the opening and closing of the car door depending upon the presence or absence of a floor service request from the terminal floor.

If the passenger demand is higher than the system capacity, elevator cars will be dispatched from the terminal floors as quickly as possible.

On-line real-time demand data (block 72) includes floor service-request pushbutton data (block 98) obtained from floor call detector means 14 shown in FIG. 3. Also included in demand data block 72 are in-car service requests in this car (block 100), in-car service requests in other cars in the same shaft group (block 102), and in-car service requests in other cars in the shaft (block 104), all of which data are obtained from car call detector means 16 shown in FIG. 3.

On-line real-time car data (block 74) includes location of leading car(s) in shaft (block 106), location of this car in shaft (block 108), location and direction of travel of other cars in same shaft group (block 110), and location of following car(s) in shaft (block 112), all of which data are obtained from car location and speed detector means 30-1 shown in FIG. 3.

8. Illustration of Demand-Responsive Car Dispatching Method

Assume, for example, that directional passenger demand for travel in the upward direction in a shaft group is estimated to be 10 persons. If a car, or cars, in service are estimated as being capable of servicing all 10 demands, the current directional dispatch demand (block 86) for travel in the upward direction would equal zero. Under these circumstances, if the passenger loading threshold limit was zero, a car would be dispatched immediately since the current directional dispatch demand equals the passenger loading threshold limit using the demand-responsive method of scheduling dispatch. If, on the other hand, the passenger loading threshold limit for upward travel was greater than zero, no elevator car would be dispatched until the current directional dispatch demand for travel in the upward direction equaled the passenger loading threshold limit.

Figure 6:
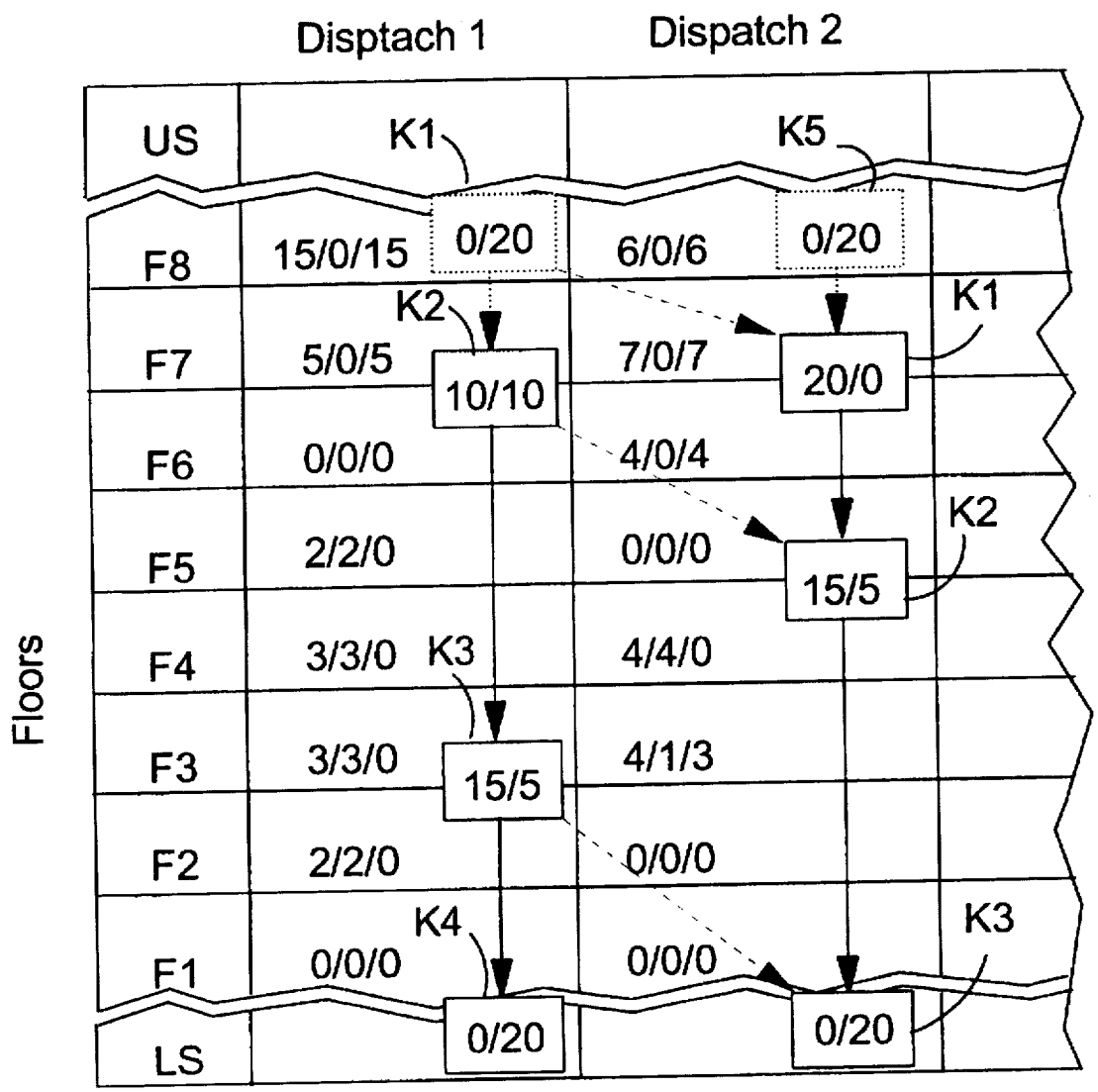
FIG. 6 is a diagram showing conditions at first and second dispatch times for use in illustrating the demand-responsive car dispatching method of this invention.

Reference now is made to the diagram of FIG. 6 wherein conditions at first and second dispatch times identified as dispatch 1 and dispatch 2 are shown to further illustrate the demand-responsive car dispatching method of this invention. Floors F1 through F8 are depicted in FIG. 6 together with an upper storage area US and lower storage area LS. In this illustration, floor F1 comprises the lower terminal floor of a building and floor F8 comprises the upper terminal floor. Elevator cars K1 through K5 are shown in the diagram, which cars are about to service, have serviced, or are in the process of servicing directional passenger demand in the downward direction. The two numbers inside the cars identify the number of passengers in the car and the number of additional passenger spaces available in the car at the time of dispatch 1 and at the time of dispatch 2. For purposes of illustration, it will be assumed that each elevator car has a capacity of 20 passengers. In this case, the numbers 15/5, such as shown at car K3 at dispatch 1 time, show that there are fifteen passengers currently in the car, and that there is room enough for five additional passengers. The three numbers at the building floors identify, in order, the estimated floor demand for service in the downward direction at the floor, the number of persons at the floor to be serviced by cars presently in service, and the number of persons at the floor to be serviced by a newly dispatched car. For example, the numbers 4/1/3 at floor F3 at dispatch 2 time indicate that four persons at the floor are awaiting downward service, that one of the four persons can be serviced by car(s) presently in service, and that three of the four persons are to be serviced by a newly dispatched car. It will be assumed that the passenger loading threshold limit for travel in the downward direction is twenty, which is the capacity of the cars, at both the dispatch 1 and dispatch 2 times. For purposes of illustration, the number of passengers in cars K1 and K5 at dispatch 1 and 2 times, respectively, is zero indicating that passengers waiting for downward service at floor F8 have not yet entered those cars. Those cars, at floor F8, are shown in broken line boxes.

At dispatch 1 time, car K1 is to be dispatched at floor F8, car K2 is intermediate floors F7 and F6, car K3 is intermediate floors F3 and F2, and car K4 is at the lower storage. The two persons waiting for downward service at floor F2 may be serviced by car K3 which, at the time, has room for five additional passengers. Also, the three persons at floor F3, the three at floor F4, and the two at floor F5 waiting for downward service at floors F3, F4 and F5, respectively, may be serviced by car K2 which, at the time has room for ten additional passengers. Under these conditions, the passenger loading threshold limit, which was assumed to be twenty, is reached when it is estimated that five persons are awaiting downward service at floor F7 and fifteen await downward service at floor F8. Elevator car K1 is dispatched at dispatch 1 time when the measure of estimated passenger demand for travel in the downward direction that is incapable of being met by elevator cars currently in service (here cars K2 and K3) at least equals the passenger loading threshold limit (here twenty). The cars shown in FIG. 6 are those in a shaft group, without regard to the number of cars in any one hoistway.

When the next car is dispatched, here car K5, at dispatch 2 times, car K1 has descended to a location between floors F6 and F7, car K2 to a location between floors F4 and F5, and car K3 to the lower storage area LS. Car K2, which has room for five additional passengers, is capable of accommodating all four persons waiting for downward service at floor F4 and one of the four persons waiting for service at floor F3. Car K1, the only other car currently in service, is full and therefore is determined to be incapable of providing any additional downward passenger service. At dispatch 2 time, the number of passengers to be serviced by a newly dispatched car, i.e. car K5, includes six at floor F8, seven at floor F7, four at floor F6 and three at floor F3 for a total of twenty, which at least equals the passenger loading threshold limit of twenty which was assumed for the present example. As noted above, operation, with a high passenger loading threshold limit is well adapted for use in the high traffic demand direction of travel.

It here will be noted that in any elevator car dispatching method employing the demand-responsive method, operation is not limited to that shown in FIG. 6 and described above. The number of passengers in cars not only may be estimated in real-time as described above, but an estimate of the number of passengers expected to be present later may be obtained. Using historical directional demand data, it may be ascertained that a number of passengers during a given time period disembark at a floor other than a terminal floor. For example, if it is known that many passengers disembark at floor F6, at which floor, say, a lunch room is located, then when car K1 is located between floors F6 and F7, as seen in FIG. 6, it may be estimated that car K1 is capable of servicing a number of passengers awaiting service at floor F6 or below rather than the number zero shown in FIG. 6. This estimate is based on the fact that historically a number of passengers in the full car K1 will disembark at floor F6.

With the computer control system of this invention, a wide variety of car operating modes are possible, which modes may be dynamically changed to accommodate current operating conditions. With one such mode relating to the starting and stopping of cars in the same shaft, starting of a car (block 92) is allowed only if, 1. The nearest leading car in the same shaft has traveled further than the distance considered to be the safe limit, or
2. The nearest leading car has traveled farther than the floor requested for the following car, and the following car has acknowledged the request.

In another operating mode relating to starting and stopping of cars, two or more cars in the same shaft are made to simultaneously move in the same direction at the same speed so as to function, essentially, as a unitary car having different decks. This operating mode, which is described in greater detail hereinbelow, is of particular benefit when returning cars from one terminal floor to the other in the direction of substantially no demand.

The number of cars made available for operation may be varied according to the level of demand under control of data from next car to dispatch/store (block 94). When the demand is extremely light, operation with one or no cars in a shaft may suffice. Under such extremely light demand conditions, elevator operation may be switched to the request responsive dispatch method wherein an elevator car is dispatched to the floor requesting service.

Figure 7:
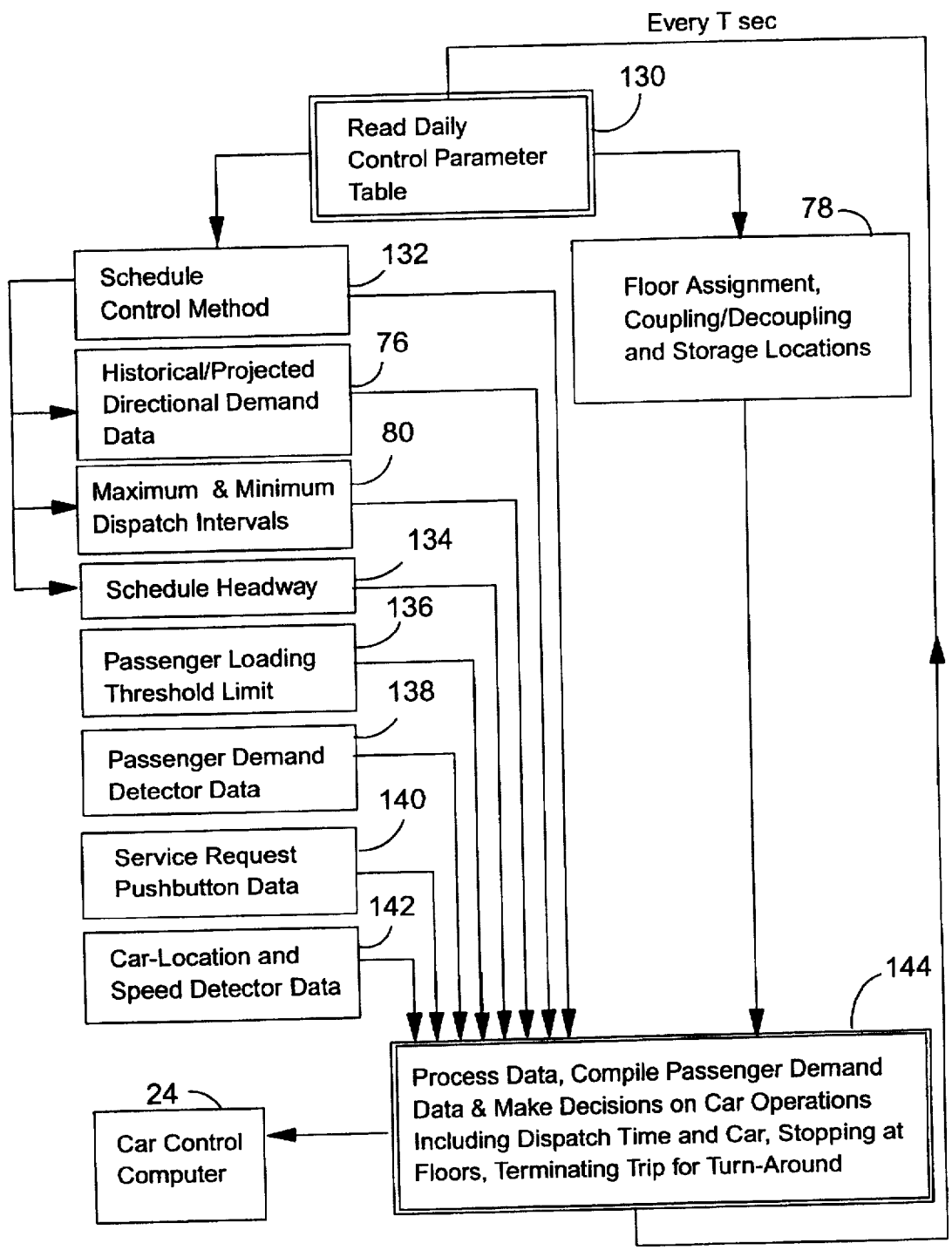
FIG. 7 is a simplified work flow diagram for use in explaining operation of the control system of this invention.

As passenger demand increases to a steady but very light level, single car operation may still be used, but the car dispatch method may be changed to either the scheduled or demand-responsive method. Then, as passenger demand continues to grow, the same car dispatch method may be used, but the number of cars in the same elevator shaft will be increased. The selection of dispatch control methods on a real-time basis is shown in FIG. 7 and described hereinbelow.

As noted above, when more than one car in a shaft is used to provide elevator service, for safety reasons, it is preferred that the cars travel from one end of the shaft to the other without reversing direction at an intermediate floor. Obviously, other modes of operation are possible. For example, when demand is heavily one-directional in the direction of the major traffic flow, as in peak periods, the car may be stopped at an intermediate floor where the last passenger disembarks if, 1) The following car (or cars) does (or do) not have to travel to or farther than this floor, in the direction of the major traffic flow, and
2) There are no service requests from the floors beyond this floor in the direction of major traffic flow, and
3) The car does not have to be stored at the other end of the shaft to accommodate a shift in demand.

Under these circumstances, the car will be turned around as soon as possible, as shown at terminate trip en route decision block 114. The turn-around at an intermediate floor operation generally would be used in conjunction with one of the above-described methods of dispatching cars from the terminal floors.

Obviously, when passenger demand is very light, and only one car is operating in a shaft, the car may be stopped at an intermediate floor and remain there until there is a service requested at a floor.

9. Car-Bunching Control

To avoid bunching and maintain proper arrivals of elevators at each floor, the cars are allowed to skip floors even when it is known that some passengers are waiting at these floors. In FIG. 5, decision block 116 labelled stop or skip floors en route is shown which decision is dependent upon data shown in a plurality of data blocks. The schedule control computer 28 determines to skip a floor if all of the following conditions are met, 1) The car is behind schedule, or another car is following this car within a predefined desirable limit, and
2) No stop request to stop at the next floor is made from the in-car pushbutton 16 in this car, and
3) Space is available in the following car(s), or a passenger in the following car(s) requests a stop at that floor.

Even if the car is on schedule, the schedule control computer 28 can determine to skip the next floor if all the following conditions are met, 1) No request to stop at the next floor is made from the in car pushbutton 16 in this car, and
2) No space is available for extra passengers in this car, and
3) Space is available in the following car(s), or a passenger in the following car(s) requests a stop at that floor.

10. Tandem Travel

When passenger demand is sufficiently large to justify operation of a plurality of elevator cars in a single shaft, it generally is desirable to minimize the dispatch interval between cars in the same shaft travelling in the direction of high demand so as to minimize car waiting time at the destination. If passenger demand in the return direction is low, additional savings in car waiting time may be obtained during the return trip by operating cars in the same shaft simultaneously and at the same speed. In this tandem operating mode, cars are simultaneously dispatched and travel as a unit in the manner of a multi-deck elevator car. If stops for passengers are required, all operatively coupled cars in the shaft start and stop substantially simultaneously. The plurality of cars may be made to operate simultaneously in tandem by individual computer control of the car drive motors, or by mechanical connecting means between the drive motors that is movable between engaged and disengaged condition under computer control. With this lock-step operation of cars, the dispatch interval between cars is reduced to substantially zero, and no delay between stopping and starting of adjacent cars is required, yet operation is safe since all cars are required to simultaneously travel at the same speed whereby the relative speed between cars is zero. For example, during the morning rush period of an office building when almost all passenger demand is upward from the lower terminal floor and there is substantially no downward passenger demand, the demand-responsive/scheduled control method may be selected for use during upward travel and the tandem control method may be selected for use during downward travel. Obviously other combinations of control methods may be employed as desired using the present invention. Car coupling and decoupling decisions are shown based upon on-line computer resident coupling/decoupling data (block 78). Obviously, such coupling and decoupling decisions may be based upon on-line real-time demand data (block 72), if desired.

11. Executing the Car Schedule Control Operation

Reference now is made to FIG. 7 wherein work activities and data flow in the schedule control computer 28 are shown. Memory associated with schedule control computer 28 includes a daily control parameter table containing data identifying one or more control parameters to be used for operation of the elevator cars.

Control parameters in the daily control parameter table include,

1) Schedule control methods, or algorithms,
2) The floors to be served by each shaft, and the floors at which the cars are stored when they are not used for passenger operation, and
3) When coupling and decoupling of cars in the same shaft is employed.

The basic time unit of the schedule control operation is T seconds. If T comprises, for example, one second, control parameters are selected, or read (block 130) every 1 second. The selected schedule control method obtained from reading the daily control parameter table 130 is shown at block 132, and the selected floor assignment, coupling/decoupling data, and storage locations are shown at block 78. Dependent upon the selected schedule control method, historical or projected directional demand data (block 76), maximum and minimum dispatch intervals (block 80), schedule headway (block 134), and passenger loading threshold limit data (block 136) are read from, say, tables thereof included in computer memory. Schedule headway data is used in collision avoidance, described hereinbelow.

Floor passenger demand detector data (block 138) obtained from floor call detector means (block 14) and floor demand estimation detector means (block 20) of FIG. 3, in car service request pushbutton data (block 140) obtained from in car call detector means 16 of FIG. 3, and car location and speed detector data (block 142) obtained from car location and speed detector means 30-1 of FIG. 3, together with data from blocks 80, 134 and 136 is processed by the schedule control computer 28 as indicated at block 144 where passenger demand data is compiled and decisions on car operations are made. As noted above, floor passenger demand detector data (block 138) is obtained using outputs from floor call detector means 14 and floor estimation detector means 20; in car service request pushbutton data (block 140) is obtained from car call detector means 16; and car location and speed detector data is obtained from car location and speed detector means 30-1 shown in FIG. 3. Car location and speed detector data includes cars under operation and cars in storage in each shaft data.

In operation, the schedule control computer 28 updates the control parameters i.e. the control method (block 132), and floor assignment, coupling and decoupling, and storage location (block 78) for each elevator car every predetermined scanning interval, for example, every 1 second. The schedule control computer determines, among other things, the time and the shaft in which the next car is dispatched (block 144) using the updated control parameters (block 132 and block 78), and on-line data, such as, 1) Current demand and request data (blocks 138 and 140 respectively),
2) Cars under operation and left in storage in each shaft (block 78),
3) Location and direction of travel of each car travelling in each shaft (block 142), and on-line computer resident data, such as,
4) Maximum dispatch interval (block 80),
5) The cars to be used in each shaft (block 78),
6) The threshold limit for passenger loading in each car (block 136),
7) Expected passenger demand pattern for each direction of travel for that time (block 76), and/or
8) The cars to be stored at each end of the shaft for that time (block 78).

Of these, items 4), 5), and 6), above, may be updated periodically using items 7) and/or 8), above, and stored in a table, or may be changed on a real-time basis.

At the time of dispatching a car from a terminal floor, the schedule control computer 28 transmits to the car control computer 24 the relevant information, such as the shaft and/or car identification, the destination terminal floor, or storage, cars to be operated in tandem, whether turn-around is permitted, whether turned-around cars should stop to pick up passengers, and maximum passenger loading limit. The turn-around operation may be executed either by the schedule control computer or car control computer.

The car control computer dispatches the car specified by the schedule control computer. If not directly supplied to, or determined by, the schedule control computer 28, the car control computer 24 continuously transmits to the schedule control computer relevant data, such as car location, car speed, and the estimated number of passengers in the car.

The schedule control computer also determines whether the car should be stopped at the next floor. When bunching of cars is observed as described above, the schedule control computer may determine whether or not the car should skip the next floor.

The schedule control computer also determines whether the car's trip should be terminated when all of the passengers disembark intermediate the terminal floors.

As noted above, the schedule control computer 28 gathers and compiles passenger demand data (block 144) including demand that is estimated from car load weight detector means 18 in the elevator car. Historical passenger demand data is used for determining the operational policies for any given day of the week, date of the year and/or time of day.

12. Speed Control and Collision Protection

To ensure safety, two different computers e.g. the car control computer 24 and collision protection computer 26 provide speed control and collision protection for the elevator cars. Also, as noted above, at least two independently operated car location and speed detection means 30-1 and 30-2 are included for each car, and car location and speed are measured on an on-line real-time basis. The technology to perform these functions is available and used in current elevator systems and requires no detailed description here. Computations required for location, speed, acceleration/deceleration and jerk are performed by the car control computer 24 and collision protection computer 26.

The car control computer determines the acceleration or deceleration rate (and/or jerk) for operation of the cars based on the location and speed of the current and leading cars. As a safety precaution, when cars are not coupled, the so-called "brick wall" stopping policy preferably is employed in which the following car's speed is controlled by assuming that the adjacent preceding car is always stopped. The behavior of every car in the shaft is monitored by the collision protection computer 26, and if any car deviates from the permissible speed envelope, the collision protection computer will force the motor of the following car to decelerate, and/or the leading car to accelerate, at a predefined rate. Of course, this policy is not employed when the system is operated in the tandem mode wherein cars in the same shaft operate adjacent each other at the same rate.

Figure 8:
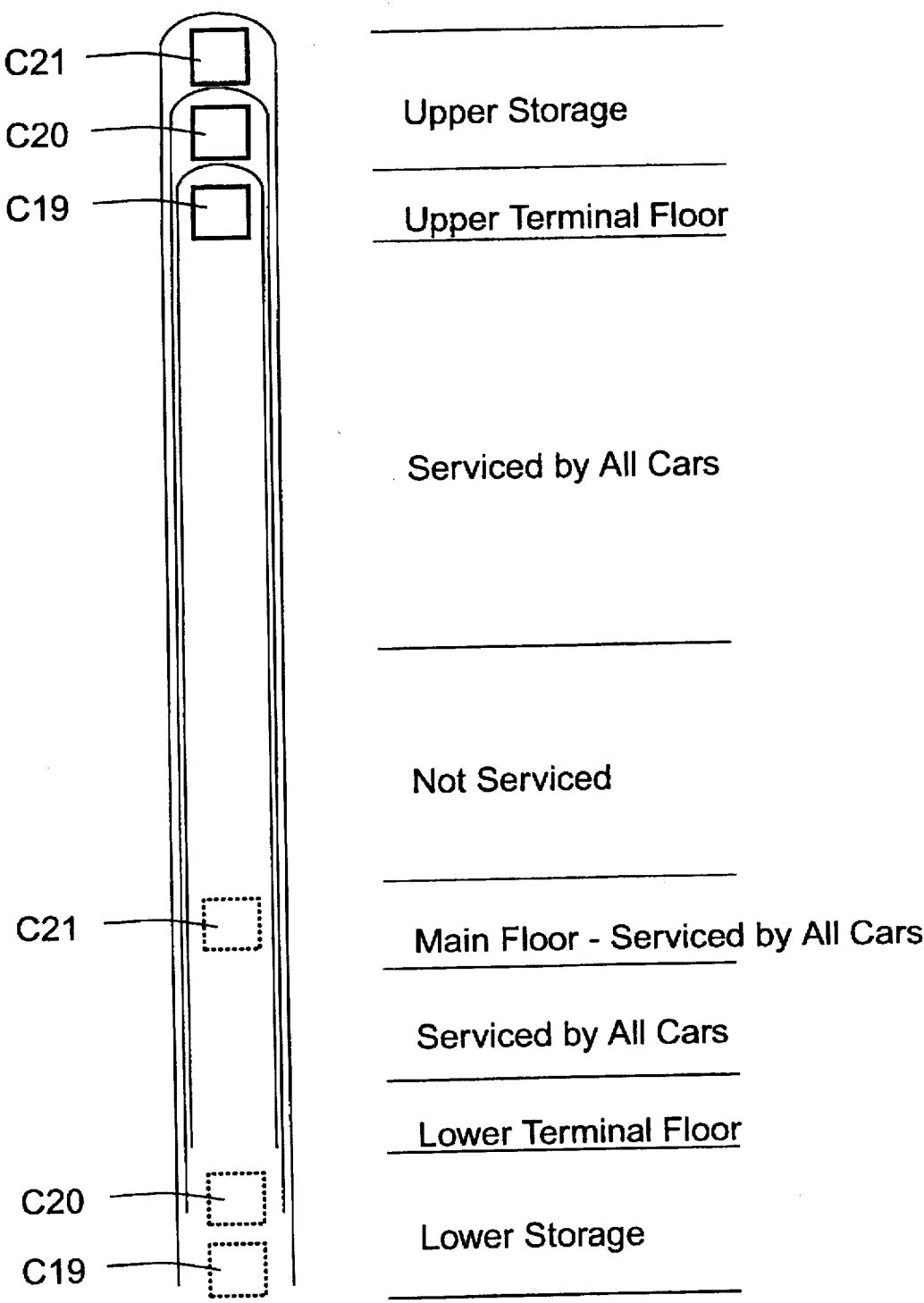
FIGS. 8, 9 and 10 diagrammatically illustrate systems wherein different elevator cars within an elevator shaft service different floors of a building.
Figure 9:
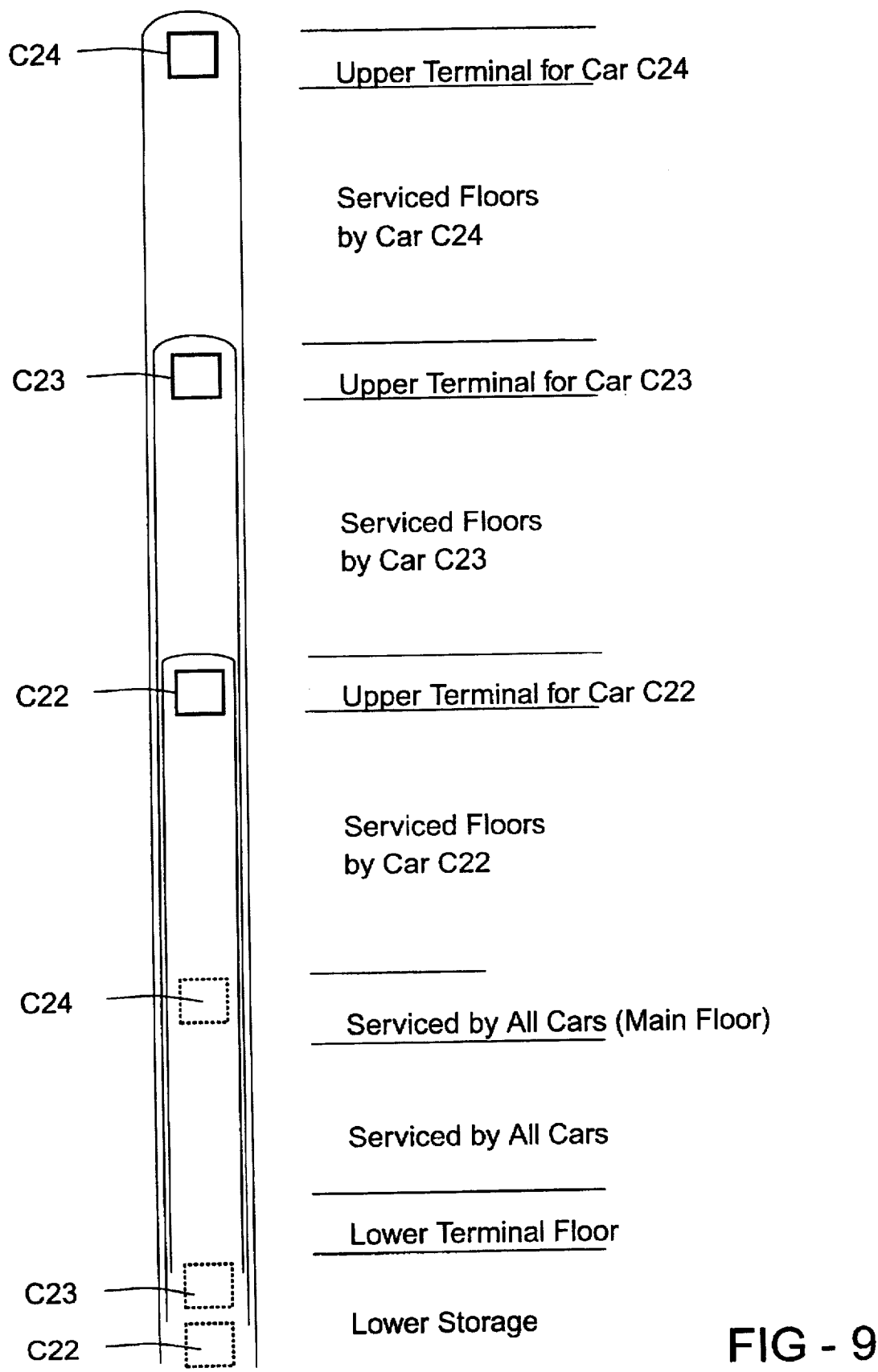
Figure 10:
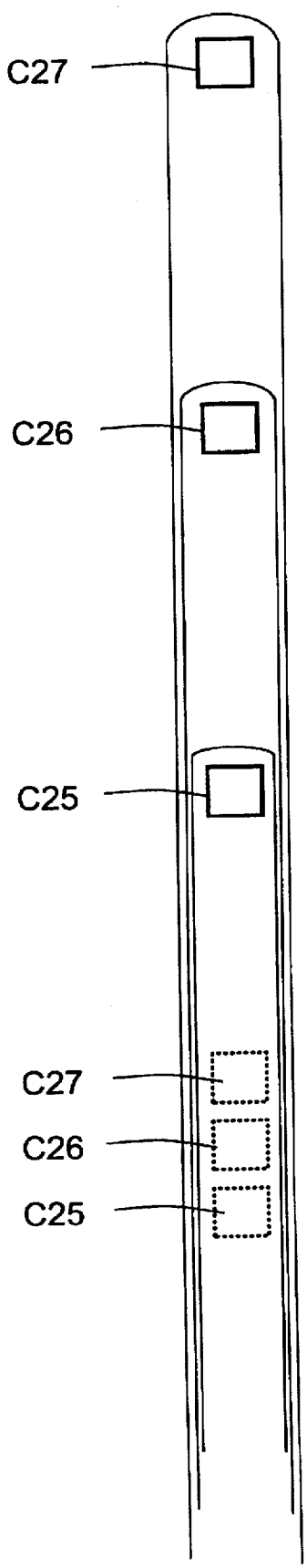

The novel elevator system of this invention is adapted for use in a variety of buildings and in a wide variety of different ways, a number of which are illustrated in FIGS. 8 through 10. Since control parameters are selected every T second it will be understood that the operating mode may be changed on a real-time basis, as desired. In FIGS. 8 through 10, an elevator shaft is shown in which three independently movable cars operate. In FIG. 8, all cars are adapted for travel between the upper and lower terminal floors, both of which terminal floors are serviced by all of the cars. The main floor also is serviced by all of the cars. Car C19 is shown located at the upper terminal floor, and cars C20 and C21 are shown at the upper storage. In the broken line position of cars, cars C19 and C20 are located at the lower storage, and car C21 is shown at the main floor. Floors between the lower terminal floor and main floor are serviced by all the cars, which floors may comprise, for example, vehicle parking floors. A group of floors immediately above the main floor are not serviced by any of the cars. Cars in other shafts, not shown, may be used for servicing these floors. A group of floors immediately below the upper terminal floor are serviced by all of the cars C19, C20 and C21.

In the FIG. 9 arrangement, all cars C22, C23 and C24, service the lower terminal floor, the main floor, and floors intermediate the lower terminal and main floors. Cars C22, C23 and C24 shown in full line are located at separate upper terminal floors at spaced locations along the elevator shaft. In the broken line position of cars, cars C22 and C23 are shown in lower storage beneath the lower terminal floor, and car C24 is shown at the main floor. The main floor, and floors intermediate the lower terminal floor and main floor are serviced by all of the cars. Above the main floor, each elevator car services different floors, with car C22 servicing a lower-most group of floors, car C23 servicing on intermediate group of floors, and car C24 servicing an upper-most group of floors. With this operating arrangement, there is no requirement for upper storage since each car is provided with its own upper terminal floor.

In FIG. 10, as in FIG. 9, each elevator car C25, C26 and C27 services different floors, and each car has its own upper terminal floor. The FIG. 10 operation differs from that of FIG. 9, however, in the inclusion of a plurality of main floors each of which is serviced by one of the cars. The use of a multiplicity of main floors is known, for example, to facilitate loading and unloading of multi-deck elevator cars. From the above it will be seen that not only is the control system adapted for on-line changes in operating mode(s) to accommodate existing passenger demand, but the system also may be used in a variety of different ways to accommodate the building structure.

The invention having been described in detail in accordance with requirements of the patent statutes, various other changes and modifications will suggest themselves to those skilled in the art. It is intended that such changes and modifications shall fall within the spirit and scope of the invention defined in the appended claims.

I claim:

1. An elevator system for a multistory structure having a plurality of floors comprising, a plurality of vertical elevator shafts each of which shafts defines a vertical pathway extending past a plurality of floors of the structure, at least one elevator car in each of said elevator shafts, each said elevator car being movable along a vertical axis for servicing a plurality of serviced floors including lower and upper terminal floors and a plurality of intermediate floors, floor call detector means at floors of said structure for registering up and down service requests for an elevator car, car call means at each elevator car for registering destination requests to floors of said structure, car position sensing means for sensing the position of elevator cars in the elevator shafts, floor demand measuring means for providing an estimate of passenger demand for travel in at least one direction of travel at floors of said structure, load measuring means for providing a measure of the number of passengers in each of said elevator cars, signal processing means including digital computer means associated with said floor call means, car call means, car position sensing means, floor demand measuring means and load measuring means for use in production of control signals for controlling said elevator cars, said signal processing means including;

means responsive to service requests from said floor call detector means, position from said car position sensing means, passenger demand from said floor demand measuring means, and measure of the number of passengers from said load measuring means for obtaining a measure of estimated passenger demand for travel in said one direction that is incapable of being met by elevator cars currently in service, means for establishing a passenger loading threshold limit for travel in the one direction from one of said terminal floors, and means for issuing a car dispatch signal for dispatch of an elevator car from said one terminal floor when the measure of estimated passenger demand for travel in said one direction that is incapable of being met by elevator cars currently in service at least equals said passenger loading threshold limit for travel in said one direction.

2. An elevator system as defined in claim 1 wherein said passenger loading threshold limit ranges from zero to maximum capacity of the elevator car to be dispatched.

3. An elevator system as defined in claim 1 including means for establishing a maximum dispatch time interval for consecutive dispatches of elevator cars from said one terminal floor, said signal processing means including, means for issuing a car dispatch signal for dispatch of an elevator car from said one terminal floor when the elapsed time since the last dispatch from said one terminal floor in said one direction of travel equals said maximum dispatch interval.

4. An elevator system as defined in claim 1 wherein,
at least two independently operated elevator cars are included in each of said elevator shafts.

5. An elevator system as defined in claim 4 wherein,
control signals produced by said signal processing means provide for simultaneous servicing of a plurality of the serviced floors by a plurality of elevator cars in each shaft.

6. An elevator system as defined in claim 4 wherein,
control signals produced by said signal processing means provide for simultaneous tandem movement of a plurality of elevator cars included in the same elevator shaft.

7. An elevator system as defined in claim 4 wherein,
each said elevator shaft includes a storage area beneath the lower terminal floor for storage of at least one elevator car at each storage area.

8. An elevator system as defined in 5 wherein, control signals produced by said signal processing means allow starting of a trailing elevator car in an elevator shaft in the direction of travel of the nearest leading elevator car only when at least one of the following conditions exists, 1) the nearest leading elevator car in said elevator shaft has traveled further than the distance considered to be a safe limit, and 2) the nearest leading elevator car in said elevator shaft has traveled farther than the floor requested for the trailing elevator car, and the trailing elevator car has acknowledged said request.

9. An elevator system as defined in claim 8 wherein, said plurality of floors comprises a plurality of groups of floors including at least an upper-most group of floors and a lower-most group of floors and the number of elevator cars in one of said elevator shafts equals the number of groups of floors, each said elevator car being associated with a different one of said groups of floors.

10. An elevator system as defined in claim 5 including means for establishing a minimum time interval between consecutive dispatches of elevator cars from said one terminal floor in a shaft group.

11. An elevator system as defined in claim 5 wherein said signal processing means includes,
means for changing the direction of travel of an elevator car at an intermediate floor between upper and lower terminal floors of the structure.

* * * * *